US012448266B2

(12) United States Patent
Song et al.

(10) Patent No.: US 12,448,266 B2
(45) Date of Patent: Oct. 21, 2025

(54) CAN OPENER

(71) Applicant: Zhuhai Kelitong Electronic Co., Ltd., Zhuhai (CN)

(72) Inventors: Xiaoxian Song, Zhuhai (CN); Jiyuan Xiang, Zhuhai (CN); Ruiping Wang, Zhuhai (CN)

(73) Assignee: Zhuhai Kelitong Electronic Co., Ltd., Zhuhai (CN)

( * ) Notice: Subject to any disclaimer, the term of this patent is extended or adjusted under 35 U.S.C. 154(b) by 0 days.

(21) Appl. No.: 18/666,663

(22) Filed: May 16, 2024

(65) Prior Publication Data

US 2025/0153991 A1 May 15, 2025

(30) Foreign Application Priority Data

Nov. 14, 2023 (CN) ........................ 202311510557.5

(51) Int. Cl.
*B67B 7/00* (2006.01)
*B67B 7/72* (2006.01)

(52) U.S. Cl.
CPC .................................. *B67B 7/385* (2013.01)

(58) Field of Classification Search
CPC .. B67B 7/38; B67B 7/385; B67B 7/30; B67B 2007/303; B67B 7/32; B67B 7/34; B25B 9/00

(Continued)

(56) References Cited

U.S. PATENT DOCUMENTS

| | | | | |
|---|---|---|---|---|
| 2,601,303 A * | 6/1952 | Landry | B67B 7/36 | 30/422 |
| 7,574,808 B2 * | 8/2009 | Mah | B67B 7/32 | 30/422 |

(Continued)

FOREIGN PATENT DOCUMENTS

| | | |
|---|---|---|
| CN | 1948123 A | 4/2007 |
| CN | 201567209 U | 9/2010 |

(Continued)

OTHER PUBLICATIONS

Chinese First Office Action dated Dec. 20, 2023 in connection with Chinese Application No. 202311510557.5.

(Continued)

*Primary Examiner* — Ghassem Alie
(74) *Attorney, Agent, or Firm* — Wolf, Greenfield & Sacks, P.C.

(57) ABSTRACT

Can opener includes a shell, power mechanism, transmission mechanism, and cutting mechanism. The transmission mechanism includes a main drive gear, eccentric disc, and movable block. The main drive gear and eccentric disc are coaxially arranged, and the surface of the main drive gear facing the eccentric disc is provided with a linkage groove. The movable block is arranged on the eccentric disc in a liftable manner to insert into or withdraw from the linkage groove. One side of the movable block is provided with a first inclined surface and a first vertical surface, and the other side is provided with a second vertical surface. When the main drive gear rotates forward, the linkage groove abuts against the first vertical surface to drive the eccentric disc to rotate forward. When it rotates forward beyond the limiting position, the linkage groove slides relative to the first inclined surface to stop driving the eccentric disc to rotate forward. When it rotates backward, the linkage groove abuts (Continued)

against the second vertical surface to drive the eccentric disc to rotate backward.

10 Claims, 7 Drawing Sheets

(58) Field of Classification Search
USPC ......... 30/416, 425, 404, 421, 417, 426, 427, 30/405, 418, 422; 81/30.2, 3.4
See application file for complete search history.

(56) References Cited

U.S. PATENT DOCUMENTS 7,596,874 B2 * 10/2009 Mah .......................... B67B 7/34 30/422
8,539,682 B2 * 9/2013 Mah .......................... B67B 7/34 30/409
8,955,227 B2 * 2/2015 Lee .......................... B67B 7/385 30/426
9,630,825 B1 * 4/2017 Lee .......................... B67B 7/385
2007/0044326 A1 * 3/2007 Sanders .................... B67B 7/34 30/401
2024/0002205 A1 * 1/2024 Liu .......................... B67B 7/385

FOREIGN PATENT DOCUMENTS

| | | | |
|---|---|---|---|
| CN | 201801373 | U | 4/2011 |
| CN | 114620664 | A | 6/2022 |
| GB | 520686 | A | 5/1940 |
| GB | 2431389 | A | 4/2007 |

OTHER PUBLICATIONS

Chinese Notice of Granting Invention Patent Rights dated Jan. 19, 2024 in connection with Chinese Application No. 202311510557.5.

* cited by examiner

CAN OPENER

CROSS-REFERENCE TO RELATED APPLICATION

The present disclosure claims priority to and the benefit of Chinese Patent Application No. 202311510557.5, filed with the Chinese Patent Office on Nov. 14, 2023, entitled "Can Opener", the contents of which are incorporated herein by reference in their entirety.

TECHNICAL FIELD

The present disclosure relates to the field of portable household appliances, and particularly to a can opener.

BACKGROUND ART

For the sake of convenience in daily life, people process certain cooked products and seal them in cans. When needed, it only needs to open the can lid for immediate consumption, which is very convenient. The electric can opener is specifically developed as a household appliance tool for opening cans. The can opener can be placed on the top of the can and rotated relative to the can during operation. The mechanical movement of the system transmitted and actuated by gear is driven by motor power so as to drive the cutting blade to exert force on the surface of the can, thus achieving the effect of completely cutting the packaging surface of the can.

For example, a Chinese patent with the authorization announcement number CN201567209U discloses a fully automatic can opener, which uses spring forces to tension the first gear so as to allow the first gear to rotate synchronously in reverse when the rotating gear is reversed, thereby driving the idler wheel to move backward. However, due to issues such as attenuation of spring force and fatigue failure, it is prone to the problem that the retracting gear cannot engage synchronously with the main drive gear, resulting in failure to retract the blade, or even getting stuck, thereby affecting the user experience.

SUMMARY

The present disclosure provides a can opener that is stable in tool retracting and easy to operate, which is realized by the following technical solutions.

A can opener is provided, comprising a shell, a power mechanism, a transmission mechanism, and a cutting mechanism. The transmission mechanism comprises a main drive gear, an eccentric disc, and a movable block. The main drive gear and the eccentric disc are coaxially arranged, and a surface of the main drive gear facing the eccentric disc is provided with a linkage groove. The movable block is arranged on the eccentric disc in a liftable manner to insert into or withdraw from the linkage groove. One side of the movable block is provided with a first inclined surface and a first vertical surface, and the other side is provided with a second vertical surface.

When the main drive gear rotates forward, the linkage groove abuts against the first vertical surface to drive the eccentric disc to rotate forward. When the main drive gear rotates forward beyond a limit position, the linkage groove slides relative to the first inclined surface to stop driving the eccentric disc to rotate forward. When the main drive gear rotates backward, the linkage groove abuts against the second vertical surface to drive the eccentric disc to rotate backward.

Optionally, the transmission mechanism further comprises a resilient component, wherein the resilient component is arranged between the eccentric disc and the movable block. A fastener is provided on the shell, wherein the fastener is configured to suppress the movable block and compress the resilient component when the main drive gear rotates forward beyond the limit position, thus causing the linkage groove to slide relative to the first inclined surface.

Optionally, the eccentric disc is provided thereon with a mounting base, wherein the movable block and the resilient component are arranged inside the mounting base.

Optionally, the mounting base is arranged therein with a movable groove and a limit slot. A bottom end of the movable block is provided with a limiting block, the movable block is arranged inside the movable groove, and the limiting block is arranged inside the limit slot.

Optionally, the fastener extends along a direction of rotation of the main drive gear. A bottom end of the fastener is provided with a first guiding surface. When the main drive gear rotates forward to the limit position, the fastener suppresses the movable block through the first guiding surface.

Optionally, the movable block is provided with a second guiding surface corresponding to the first guiding surface. When the main drive gear rotates forward to the limit position, by sliding the first guiding surface relative to the second guiding surface, the fastener suppresses the movable block.

Optionally, the movable block is arranged with a clamping groove corresponding to the fastener. The mounting base is arranged with an avoidance groove corresponding to the fastener. When the main drive gear rotates forward to the limit position, the fastener extends into the avoidance groove and the clamping groove, thereby suppressing the movable block.

Optionally, the movable block comprises a base and a protrusion. The first inclined surface and the first vertical surface are arranged on one side of the protrusion, and the second vertical surface is arranged on the other side of the protrusion. The protrusion can be inserted into or withdrawn from the linkage groove.

Optionally, multiple linkage grooves are distributed at an equal interval along the direction of rotation of the main drive gear.

Optionally, the linkage groove is a fan-shaped groove.

This design has the following advantages. When the motor drives the main drive gear to rotate forward, the linkage groove abuts against the first vertical surface of the movable block. This drives the eccentric disc to rotate forward synchronously, which in turn drives the hollow wheel to be close to the cutting wheel so as to complete the cutting feed. When rotating forward to the limit position, the movable block descends and exits a certain distance from the linkage groove, and the linkage groove contacts the first inclined surface of the movable block. When the main drive gear continues to rotate forward, the linkage groove slides through the first inclined surface of the movable block; the movable block and the eccentric disc stop rotating forward with the main drive gear, thereby completing the can-opening operation. When the motor drives the main drive gear to rotate backward, the movable block re-enters the linkage groove, and the linkage groove tightly abuts against the second vertical surface of the movable block. The movable block and the eccentric disc rotate backward together with the main drive gear, subsequently driving the hollow wheel to be away from the cutting wheel to complete the retraction. The can opener can realize a smooth and reliable retracting function, which is convenient for users to operate and enhances the user experience.

REFERENCE NUMERALS IN DRAWINGS

10—shell; 11—top shell; 12—bottom shell; 121—fastener; 1211—first guiding surface;

20—power mechanism; 21—motor;

30—transmission mechanism; 31—main drive gear; 311—linkage groove; 3111—inner side wall; 32—eccentric disc; 321—mounting base; 3211—movable groove; 3212—limit slot; 3213—avoidance groove; 322—eccentric wheel;

33—movable block; 331—base; 3311—clamping groove; 3312—limit block; 3313—second guiding surface; 332—protrusion; 3321—first inclined surface; 3322—first vertical surface; 3323—second vertical surface; 34—gear set; 35—main drive shaft; 36—resilient component; 37—waist-shaped plate; 38—sliding plate;

40—cutting mechanism; 41—cutting wheel; 42—idler wheel;

50—limit position.

DETAILED DESCRIPTION OF EMBODIMENTS

Combining the drawings and specific embodiments, further detailed explanations of the content of the present disclosure are provided.

Figure 5:
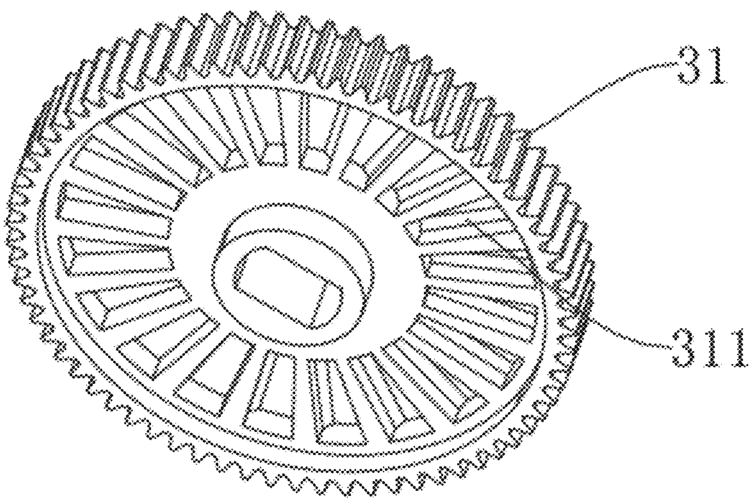
FIG. 5 is a schematic diagram of the structure of the main drive gear of the can opener of FIG. 1.
Figure 6:
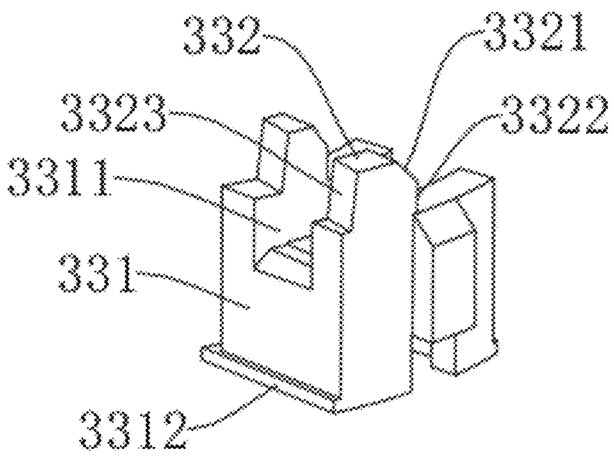
FIG. 6 is a schematic diagram of the structure of a movable block of the can opener of FIG. 1.

As shown in FIGS. 1 to 4, the embodiment provides a can opener comprising a shell 10, a power mechanism 20, a transmission mechanism 30, and a cutting mechanism 40. The transmission mechanism 30 comprises a main drive gear 31, an eccentric disc 32, and a movable block 33; the main drive gear 31 and the eccentric disc 32 are coaxially arranged, and a surface of the main drive gear 31 facing the eccentric disc 32 is provided with a linkage groove 311 (as shown in FIG. 5); the movable block 33 is arranged on the eccentric disc 32 in a liftable manner to insert into or withdraw from the linkage groove 311; one side of the movable block 33 is provided with a first inclined surface 3321 and a first vertical surface 3322, and the other side is provided with a second vertical surface 3323 (as shown in FIG. 6).

Figure 8:
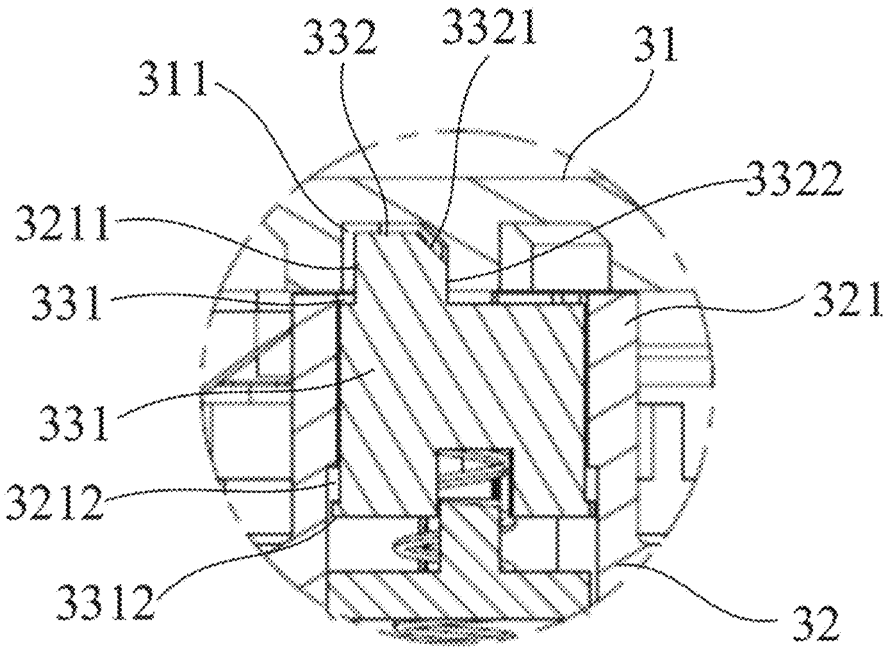
FIG. 8 is a schematic diagram of the structure of the movable block and the linkage groove of the can opener of FIG. 1 in a starting position of a forward rotation.
Figure 9:
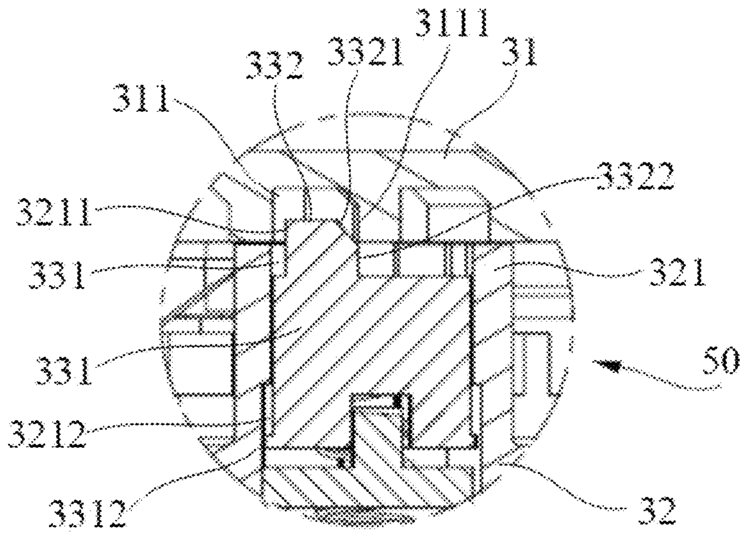
FIG. 9 is a schematic diagram of the structure of the movable block and the linkage groove of the can opener of FIG. 1 in a limit position of the forward rotation.
Figure 10:
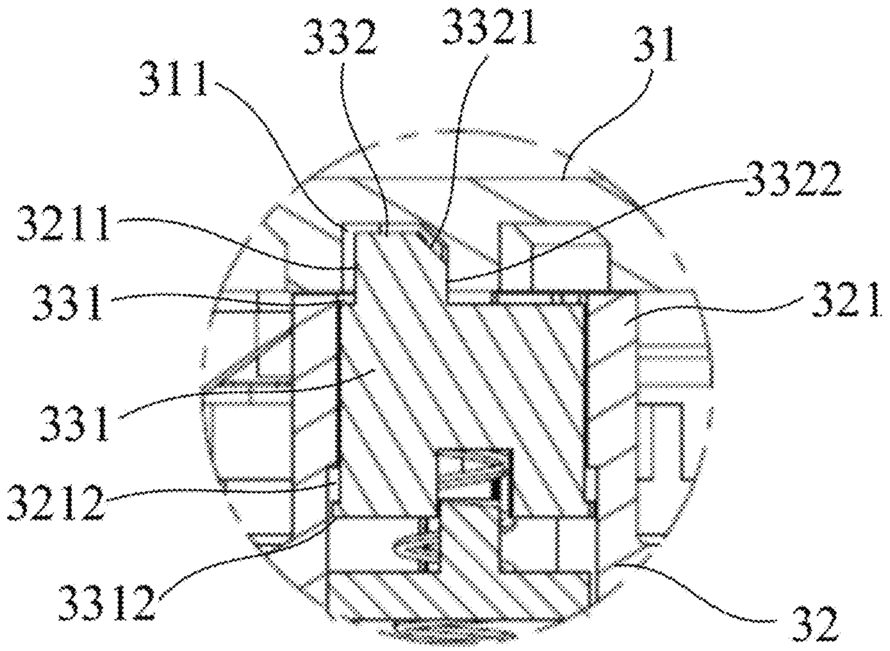
FIG. 10 is a schematic diagram of the structure of the movable block and the linkage groove of the can opener of FIG. 1 in a starting position of a backward rotation.

When the main drive gear 31 rotates forward, the linkage groove 311 abuts against the first vertical surface 3322 to drive the eccentric disc 32 to rotate forward (as shown in FIG. 8). When the main drive gear 31 rotates forward beyond a limit position, the linkage groove 311 slides relative to the first inclined surface 3321 to stop driving the eccentric disc 32 to rotate forward (as shown in FIG. 9). When the main drive gear 31 rotates backward, the linkage groove 311 abuts against the second vertical surface 3323 to drive the eccentric disc 32 to rotate backward (as shown in FIG. 10).

Figure 11:
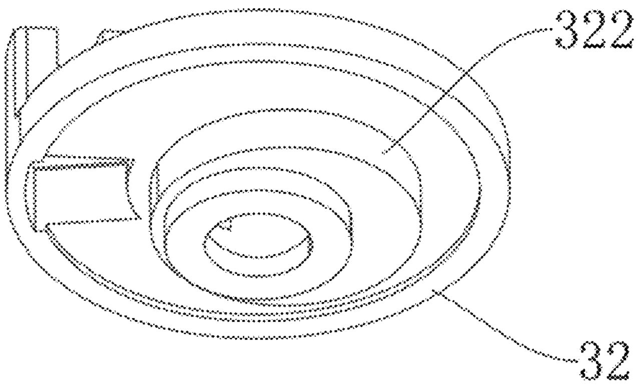
FIG. 11 is a schematic diagram of the structure of an eccentric disc of the can opener of FIG. 1.

In the embodiment, the shell 10 comprises a top shell 11 and a bottom shell 12 that vertically fit together. The power mechanism 20 comprises a motor 21. The transmission mechanism 30 also comprises a gear set 34, a waist-shaped plate 37, and a sliding plate 38. The cutting mechanism 40 comprises a cutting wheel 41 and an idler wheel 42. The motor 21 is connected to the main drive gear 31 through the gear set 34 in a transmission way. The main drive gear 31 is fixedly connected to the cutting wheel 41 via a main drive shaft 35, and the eccentric disc 32 is sleeved on the main drive shaft 35. The bottom of the eccentric disc 32 is provided with an eccentric wheel 322 (as shown in FIG. 11). One end of the waist-shaped plate 37 is provided with a circular hole, and the waist-shaped plate 37 is sleeved on the outer side of the eccentric wheel 322 through the circular hole. The waist-shaped plate 37 is fixed on the sliding plate 38, and the sliding plate 38 can slide back and forth on the bottom shell 12. The main drive gear 31 drives the cutting wheel 41 to rotate via the main drive shaft 35. Simultaneously, the main drive gear 31 rotates through the movable block 33 and the eccentric disc 32. The eccentric disc 32 drives the movable block 33 and the sliding plate 38 to slide forward and backward via the eccentric wheel 322, thereby driving the idler wheel 42 to move close to or away from the cutting wheel 41.

When cutting cans with the can opener, firstly, the cutting wheel 41 and the idler wheel 42 are placed on both sides of the edge of the can lid. During the cutting feed, the idler wheel 42 moves close to the cutting wheel 41, the idler wheel 42 and the cutting wheel 41 clamp the edge of the can lid tightly. By rotating along the edge of the can lid for one revolution, the operation of the can opening is completed. During retraction, the idler wheel 42 moves away from the cutting wheel 41, thus separating the can opener from the can.

When the motor 21 drives the main drive gear 31 to rotate forward, the linkage groove 311 abuts against the first vertical surface 3322 of the movable block 33, so as to drive the eccentric disc 32 to rotate forward synchronously, which in turn drives the hollow wheel to be close to the cutting wheel 41 so as to complete the cutting feed. When rotating forward to the limit position, the movable block 33 descends and exits a certain distance from the linkage groove 311, and the linkage groove 311 contacts the first inclined surface 3321 of the movable block 33. When the main drive gear 31 continues to rotate forward, the linkage groove 311 slides through the first inclined surface 3321 of the movable block 33; and the movable block 33 and the eccentric disc 32 stop rotating forward with the main drive gear 31, thereby completing the can-opening operation. When the motor 21 drives the main drive gear 31 to rotate backward, the movable block 33 re-enters the linkage groove 311, and the linkage groove 311 tightly abuts against the second vertical surface 3323 of the movable block 33. The movable block 33 and the eccentric disc 32 rotate backward together with the main drive gear, subsequently driving the hollow wheel to be away from the cutting wheel 41 to complete the retraction. The can opener can realize a smooth and reliable retracting function, which is convenient for users to operate and enhances the user experience.

Figure 1:
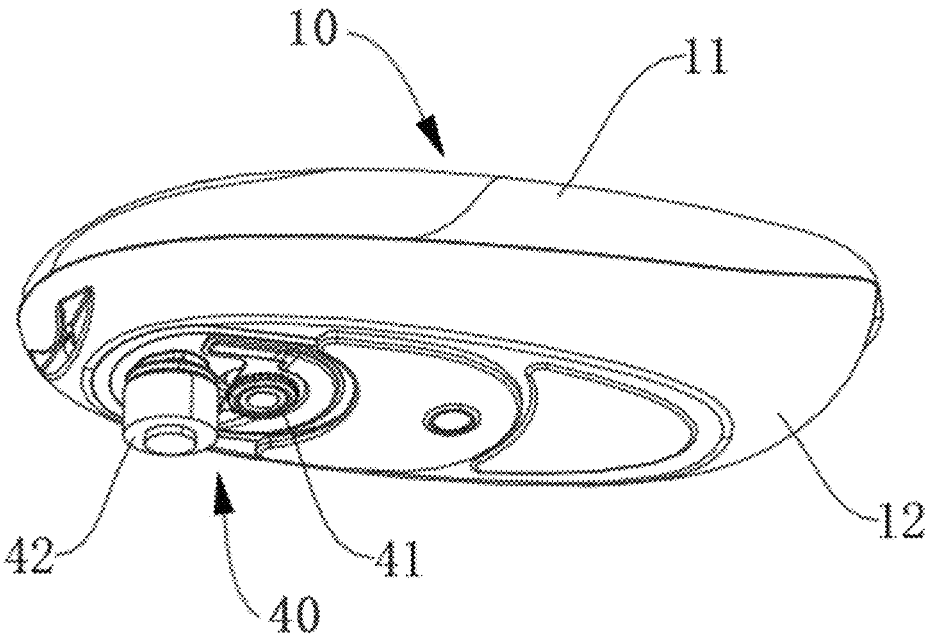
FIG. 1 is a schematic diagram of an overall structure of a can opener in an embodiment of the present disclosure.
Figure 2:
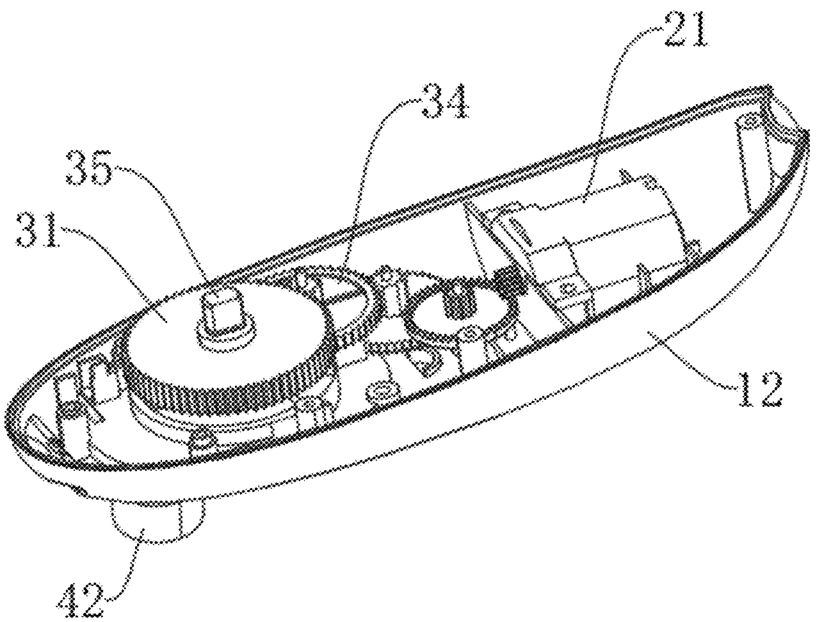
FIG. 2 is a schematic view of the structure of the can opener of FIG. 1 with a top cover removed.
Figure 3:
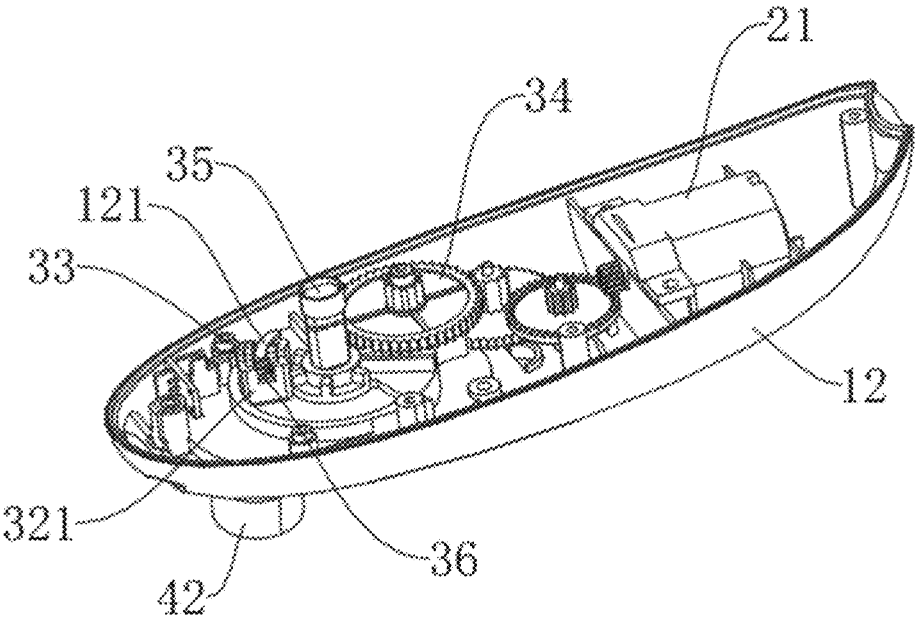
FIG. 3 is a schematic view of the structure of the can opener of FIG. 1 with the top cover and a main drive gear removed.
Figure 4:
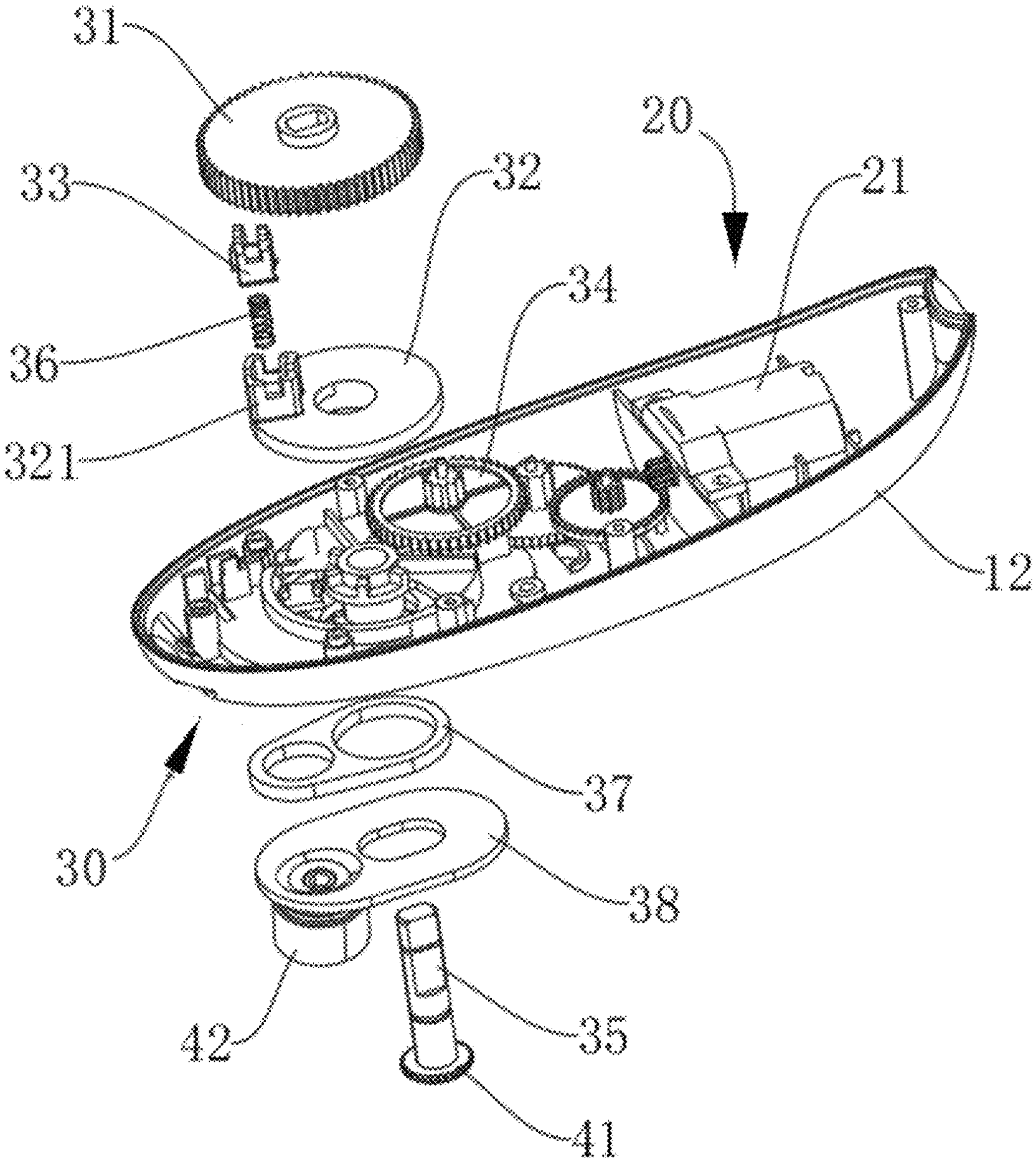
FIG. 4 is a schematic diagram of the disassembled structure of the can opener of FIG. 1.

Further, referring to FIGS. 3 to 4, the transmission mechanism 30 further comprises a resilient component 36, wherein the resilient component 36 is arranged between the eccentric disc 32 and the movable block 33; and a fastener 121 is provided on the shell 10, wherein the fastener 121 is configured to suppress the movable block 33 and compress the resilient component 36 when the main drive gear 31 rotates forward beyond the limit position, thus causing the linkage groove 311 to slide relative to the first inclined surface 3321. Specifically, the resilient component 36 is a spring.

When being in the initial position of forward rotation, the movable block 33 rises under the thrust action of spring. The movable block 33 on the eccentric disc 32 inserts into the linkage groove 311 of the main drive gear 31. At this time, the first vertical surface 3322 of the movable block 33 tightly abuts against the linkage groove 311 and cannot slide. Therefore, when the main drive gear 31 rotates forward, the eccentric disc 32 is driven to rotate forward, as shown in FIG. 8. When the eccentric disc 32 is rotated to contact the fastener 121 of the bottom shell 12, the fastener 121 starts to pull the movable block 33 to move downward. At this point, the first vertical surface 3322 of the movable block 33 still tightly abuts against the linkage groove 311, but the contact area gradually decreases. At this time, the eccentric disc 32 is still driven to rotate forward. When the main drive gear 31 continues to rotate forward, the movable block 33 and the eccentric disc 32 rotate forward together to reach the end of the fastener 121 of the bottom shell 12. The fastener 121 has already pulled the movable block 33 to move downward. At this point, only the first inclined surface 3321 of the movable block 33 contacts the groove of the main drive gear 31. The groove of the main drive gear 31 slides through the first inclined surface 3321 of the movable block 33; the movable block 33 and the eccentric disc 32 stop rotating forward with the main drive gear 31, as shown in FIG. 9. In this way, with the main drive gear 31 continuously rotating forward while the eccentric disc 32 remains fixed in one position, the can-opening function is achieved. To retract after completing the can-opening process, the main drive gear 31 rotates in reverse. At this point, the second vertical surface 3323 of the movable block 33 tightly abuts against the linkage groove 311, and they are in vertical contact and cannot slide. As a result, the movable block 33 and the eccentric disc 32 rotate backward together with the main drive gear, as shown in FIG. 10. When the movable block 33 exits the fastener 121 of the bottom shell 12, the movable block 33 continues to move upward under the action of spring force, with a larger contact area, such that the two are even more impossible to slide. The movable block 33 and the eccentric disc 32 continue to rotate backward with the main drive wheel until they touch the travel switch to cut off the power to stop, then they return to the initial position and complete one cycle.

Further, referring to FIGS. 3 to 4, the eccentric disc 32 is provided thereon with a mounting base 321, wherein the movable block 33 and the resilient component 36 are arranged inside the mounting base 321. As shown in FIGS. 8 to 10, the mounting base 321 is arranged therein with a movable groove 3211 and a limit slot 3212; a bottom end of the movable block 33 is provided with a limiting block 3312, the movable block 33 is arranged inside the movable groove 3211, and the limiting block 3312 is arranged inside the limit slot 3212. In this way, the movable block 33 moves up and down within the movable groove 3211. The spring is located between the movable block 33 and the mounting base 321, thus enabling the movable block 33 to rise. The limit block 3312 and the limit slot 3212 cooperate to restrict the distance that the movable block 33 rises, so that the movable block 33 is prevented from being dislodged from the mounting base 321.

Figure 7:
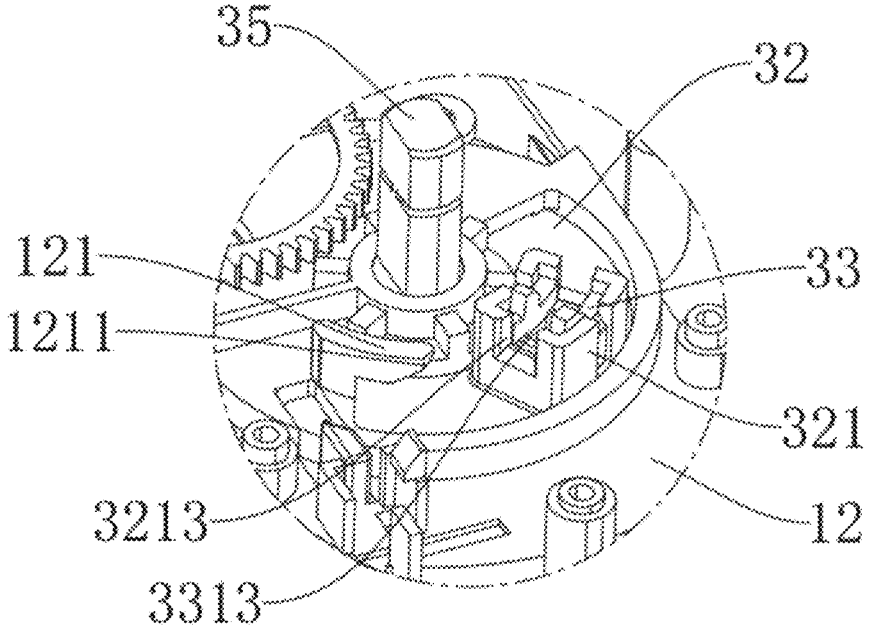
FIG. 7 is a schematic diagram of the structure of the movable block and a linkage groove of the can opener of FIG. 1.

Further, referring to FIG. 7, the fastener 121 extends along a direction of rotation of the main drive gear 31; a bottom end of the fastener 121 is provided with a first guiding surface 1211; and when the main drive gear 31 rotates forward to the limit position, the fastener 121 suppresses the movable block 33 through the first guiding surface 1211. Further, the movable block 33 is provided with a second guiding surface 3313 corresponding to the first guiding surface 1211; and when the main drive gear 31 rotates forward to the limit position, by sliding the first guiding surface 1211 relative to the second guiding surface 3313, the fastener 121 suppresses the movable block 33. The first guiding surface 1211 and the second guiding surface 3313 are inclined surfaces that cooperate with each other. When the main drive gear 31 rotates forward to the limit position, the fastener 121 gradually lowers the movable block 33, thus causing the linkage groove 311 to contact the first inclined surface 3321 of the movable block 33.

Further, the movable block 33 is arranged with a clamping groove 3311 corresponding to the fastener 121; the mounting base 321 is arranged with an avoidance groove 3213 corresponding to the fastener 121; and when the main drive gear 31 rotates forward to the limit position, the fastener 121 extends into the avoidance groove 3213 and the clamping groove 3311, thereby suppressing the movable block 33.

Further, the movable block 33 comprises a base 331 and a protrusion 332; the first inclined surface 3321 and the first vertical surface 3322 are arranged on one side of the protrusion 332, and the second vertical surface 3323 is arranged on the other side of the protrusion 332; and the protrusion 332 can be inserted into or withdrawn from the linkage groove 311. The base 331 of the movable block 33 is located within the mounting base 321, and the protrusion 332 of the movable block 33 protrudes from the mounting base 321 and inserts into the linkage groove 311.

Further, multiple linkage grooves 311 are distributed at an equal interval along the direction of rotation of the main drive gear 31. The linkage groove 311 is a fan-shaped groove. Thus, when the main drive gear 31 rotates forward or backward, it allows the movable block 33 to quickly cooperate with the linkage groove 311.

The above-detailed description is provided for exemplary embodiments of the present disclosure and is not intended to limit the scope of the present disclosure. Any equivalent implementations or modifications that do not depart from what is provided by the present disclosure should be included within the scope of the present disclosure.

The invention claimed is:

1. A can opener, comprising a shell, a power mechanism, a transmission mechanism, and a cutting mechanism, wherein a fastener is provided on the shell, and the transmission mechanism comprises a main drive gear, an eccentric disc, a movable block, and a resilient component arranged between the eccentric disc and the movable block;

the main drive gear and the eccentric disc are coaxially arranged, and a surface of the main drive gear facing the eccentric disc is provided with at least one linkage groove;

the movable block is arranged on the eccentric disc in a liftable manner to insert into or withdraw from the at least one linkage groove;

one side of the movable block is provided with a first inclined surface and a first vertical surface, and the other side is provided with a second vertical surface; and when the main drive gear rotates forward, the at least one linkage groove abuts against the first vertical surface to drive the eccentric disc to rotate forward;

when the main drive gear rotates forward to a limit position, the fastener suppresses the movable block;

when the main drive gear rotates forward beyond the limit position, a portion of an inner side wall of the at least one linkage groove slides relative to the first inclined surface, thus causing the movable block to retract from the at least one linkage groove so as to stop driving the eccentric disc to rotate forward; and when the main drive gear rotates backward, the at least one linkage groove abuts against the second vertical surface to drive the eccentric disc to rotate backward.

2. The can opener according to claim 1, wherein the fastener is configured to suppress the movable block and compress the resilient component when the main drive gear rotates forward beyond the limit position, thus causing the portion of the inner side wall of the at least one linkage groove to slide relative to the first inclined surface.

3. The can opener according to claim 2, wherein the eccentric disc is provided thereon with a mounting base, wherein the movable block and the resilient component are arranged inside the mounting base.

4. The can opener according to claim 3, wherein the mounting base is arranged therein with a movable groove and a limit slot;

a bottom end of the movable block is provided with a limiting block, the movable block is arranged inside the movable groove, and the limiting block is arranged inside the limit slot.

5. The can opener according to claim 3, wherein the fastener extends along a direction of rotation of the main drive gear;

a bottom end of the fastener is provided with a first guiding surface; and when the main drive gear rotates forward to the limit position, the fastener suppresses the movable block through the first guiding surface.

6. The can opener according to claim 5, wherein the movable block is provided with a second guiding surface corresponding to the first guiding surface; and when the main drive gear rotates forward to the limit position, by sliding the first guiding surface relative to the second guiding surface, the fastener suppresses the movable block.

7. The can opener according to claim 6, wherein the movable block is arranged with a clamping groove corresponding to the fastener;

the mounting base is arranged with an avoidance groove corresponding to the fastener; and when the main drive gear rotates forward to the limit position, the fastener extends into the avoidance groove and the clamping groove, thereby suppressing the movable block.

8. The can opener according to claim 1, wherein the movable block comprises a base and a protrusion;

the first inclined surface and the first vertical surface are arranged on one side of the protrusion, and the second vertical surface is arranged on the other side of the protrusion; and the protrusion can be inserted into or withdrawn from the at least one linkage groove.

9. The can opener according to claim 1, wherein the at least one linkage groove comprises multiple linkage grooves, and the multiple linkage grooves are distributed at an equal interval along a direction of rotation of the main drive gear.

10. The can opener according to claim 9, wherein the at least one linkage groove is a fan-shaped groove.

* * * * *